Feb. 6, 1934.  A. RONZONI  1,946,238

DIE FOR FORMING SPIRAL MACARONI

Filed Sept. 26, 1933

INVENTOR
Angelo Ronzoni
BY
Emanuel Scheyer
ATTORNEY

Patented Feb. 6, 1934

1,946,238

UNITED STATES PATENT OFFICE 1,946,238

DIE FOR FORMING SPIRAL MACARONI

Angelo Ronzoni, New York, N. Y., assignor to Ronzoni Macaroni Company, Incorporated, Long Island City, N. Y.

Application September 26, 1933
Serial No. 690,990

15 Claims. (Cl. 107—14)

This invention relates to a die for the production of macaroni or dough products in which the sheet of dough forming each piece of macaroni is curled back upon itself substantially in a spiral. This type of macaroni is known as "Cavatelli".

By extruding dough through a plate having a passage of proper cross-sectional shape and opening at the discharge end of the passage, the sheet of dough formed thereby will curve back toward the plate. By this means a macaroni of substantially semi-circular cross-section can be obtained, when the extruded sheet is cut-off at the time its forward end reaches the plate. Further extrusion, after the semi-circular shape is obtained, causes a distortion of the macaroni into an irregular shape, as the forward end of the sheet is blocked by the plate against further travel. To overcome this condition, I have placed a trough on the plate, so located that the forward end of the dough sheet, as it curves back to the plate, enters the trough. The trough is so concaved, that as the sheet travels through it, upon further extrusion, said sheet is caused to curl upon itself in spiral form. When enough curling has taken place, a knife cuts off the sheet near the slot. In my preferred form, the forward edge of the sheet enters the trough at the side farthest removed from the slot. Continued extrusion causes the sheet to ride down the steep side of the trough to its bottom, curving the sheet thereby, back toward the slot and up the side of the trough nearest the slot.

Other objects and advantages will become apparent upon further study of the description and drawing, in which:—

Figure 7:
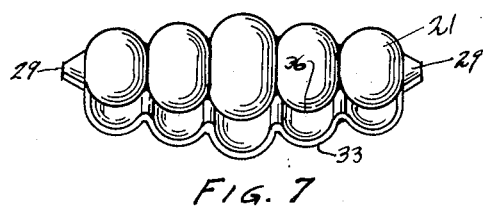
Fig. 7 is an elevation of a completed macaroni capable of being produced by the type of die plate shown in Figs. 5 and 6.
Figure 2:
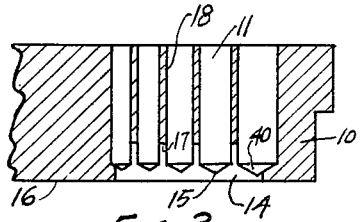
Fig. 2 is a partial section of my die plate taken along the line 2—2 of Fig. 1, said line passing continuously through the slot, curving back and forth in conformity with the waves of the slot.
Figure 8:
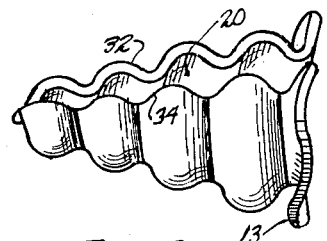
Fig. 8 is an elevation of a completed macaroni capable of being produced by the type of die plate shown in Figs. 1, 2, 3, and 4.

It is to be understood that the size, number and arrangement of passages and the size and shape of the troughs will vary in accordance with the desired size and shape of the finished product, Figs. 7 and 8 illustrating only two typical forms of the macaroni.

Die plate 10, Figs. 1, 2, 3 and 4 is provided with a plurality of rows of passages 11, and troughs 12, a trough 12 corresponding to each row of said passages. The number of rows of passages and their corresponding troughs for each die plate is a matter of choice which is determined by the number of pieces of macaroni desired to be formed simultaneously by a plate. Each passage 11 has a cone-shaped lower end 40, Fig. 2, the altitude of the cone being relatively small compared with the diameter of its base, which is also the diameter of the passage.

For the particular shape of macaroni shown in Fig. 8, denoted as a whole by the numeral 20, the diameters of the passages of a row decrease in size in passing from one end of the row to the other, the largest diameter being at the end corresponding to the largest diameter of the macaroni. The diameter of the right hand passage 11, which is the largest, produces the brim 13 of the macaroni. Cutting across the bottom of passages 11, and extending from passage to passage, is an elongated slot 14. At the apex 15 of the cone-shaped bottom 40 of each passage, slot 14 extends in depth from said apex to the bottom face 16 of the plate. At the wall 18 between adjacent passages, said slot extends from the location 17 to the bottom face 16 of the plate. In between apex 15 and location 17 for each passage 11, the top of the slot is determined by the intersection of the walls of the slot with the walls of the cone-shaped bottom. Slot 14, in plan view (Fig. 3), appears as a series of joined arcs, except for the extreme right hand segment, with the convex side of the arcs all facing the same direction. The intersections of the arcs come at locations between the passages, while the midpoints of the arcs comes at the apices 15 of the cone-shaped bottoms of the passages. The extreme right hand segment of slot 14, extends from the side of the largest passage 11, substantially in a straight line to a point substantially at the center of said passage. This extreme right hand segment cooperating with trough 12, as will be explained, causes the dough passing through it to form brim 13, Fig. 8.

Figure 9:
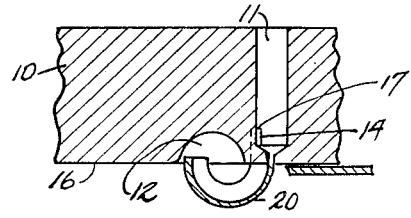
Fig. 9 is a partial section of my die plate taken in a similar manner to that of Fig. 4 except that it shows a section of macaroni just as it has curved back to the plate and is entering the trough.

As the dough is sent through a passage, friction between the dough and the walls of the passage tends to hold back the flow of the portions of the stream of dough nearer to said walls, while the central portion of the stream being free of this friction travels faster. The result is that the dough feeds faster through the portion of the slot near the center of a passage than at the sides, causing the stream of dough as it issues to curve back toward the plate as seen in Fig. 9. In order to accommodate the increased amount of dough leaving the center of a passage, the diameter of the curve of the extruded sheet on line with the center of the passage must be larger than the diameter of the curve on line with the sides of the passage. That this result may properly take place, the slot at each passage is U shaped with the crest of the U at the center of the passage. A U shape produces rounded ridges as in Figs. 7 and 8. But it will be readily understood, that variations in the shape of the slot will produce other shaped ridges or forms.

As noted before, the diameter or cross section of the passage is made larger to correspond to the ridges of the macaroni of larger diameters. It will now be understood that this is necessary to provide the extra quantity of dough required to form the ridges of the macaroni of larger diameter, the larger the diameter of the ridge, the larger the diameter of the corresponding passage.

Slot 14 where it comes between passages 11, is cut back to the location 17 which is a considerable distance up from the lower face 16 of plate 10. This connects the adjacent passages a considerable distance back from where the dough emerges from the plate, allowing the dough stream entering the slot from one passage to coalesce with that of its adjacent passage.

Figure 3:
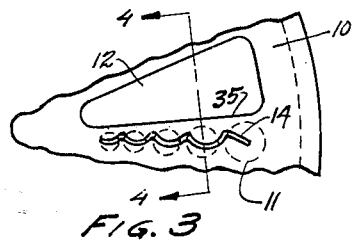
Fig. 3 is a bottom view of the die plate of Fig. 1, a fragment of such a size as only to include one set of passages and a trough being shown.

The side of trough 12 farthest removed from slot 14, Figs. 3 and 9 is located far enough away so that the forward end of the extruded sheet as it curves back toward the plate will just enter the trough. It is thus seen in Fig. 9, that the far side of the trough at the right end is at a greater distance from the slot 14 than said side at the left end. This is to accommodate the larger diameter of the curve of the dough sheet at the right than at the left. The distance of the far side of the trough from the slot decreases from right to left to suit the decreasing diameter of the ridges as determined by the cross sectional area of the passages.

Figure 4:
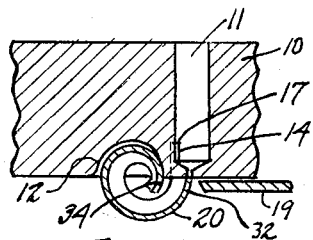
Fig. 4 is a partial section of my die plate taken along the line 4—4 of Fig. 1, and shows a section of macaroni in process of formation.

Once the forward end of the curved dough sheet 20 enters the trough, it follows down the steep side or wall of the trough and the curved bottom, causing the dough sheet to be curled back on itself, as in Fig. 4. When sufficient of this curling has taken place, knife 19, by mechanism well known to the art, is timed to cut off the extruded portion of the sheet.

The bottom of each passage 11 is cone-shaped, to facilitate the quicker extrusion of the dough from the central portion of a passage than from its side portions. The depth of the slot at the apex 15 of the cone to bottom face 16 is less than the depth of the slot at the other parts of the cone, hence there is less frictional resistance to the flow of the dough at the former location.

Figure 1:
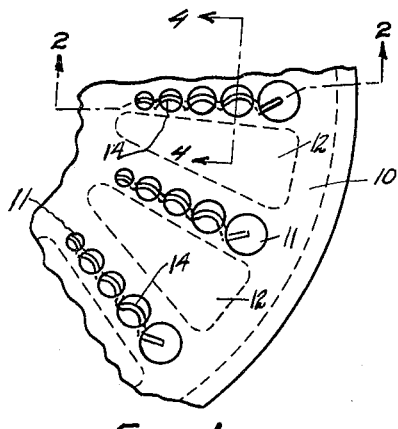
Fig. 1 is a top view of a fragment of my die plate showing a few sets of passages and troughs. This type of plate is suitable for forming the macaroni shown in Fig. 8.
Figure 5:
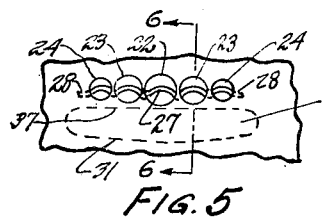
Fig. 5 is a top view of a fragment of my die plate in another form, a form capable of producing the macaroni of Fig. 7.
Figure 6:
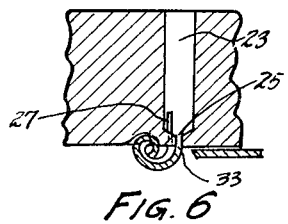
Fig. 6 is a partial section of my die plate taken along the line 6—6 of Fig. 5, a section of macaroni in process of formation being shown.

In the macaroni 21 of Fig. 7, the central ridge is the largest, the others tapering off on either side. To effect this, passage 22 is made larger than passages 23 and passages 23 are in turn made larger than passages 24. The bottom of these passages is cone-shaped, apex 25 of one of passages 23 being shown in Fig. 6. Slot 27 extends across the inner ends of the passages in a series of joined arcs, except for the end segments 28 which are straight and give rise to the cone-shaped teats 29. Substantially adjacent to the row of passages 22, 23, and 24, is a trough 30. The far side 31 of this trough is bellied in the middle to correspond to the larger diameters of passages 22 and 23. This bellying is such that the forward end of the extruded dough sheet, which is farther advanced toward the center than at the ends, because of said larger diameters, is accommodated as it curves back to the plate. In other words far side 31 is located and formed so that the dough sheet as it curves back to the plate comes just short of said side. It is only the high parts of the ridges that are accommodated. When the dough sheet comes inside of far side 31, further extrusion of the sheet causes it to slide down the steep side of the trough curling the sheet toward the slot and away from the plate, as shown in Fig. 6.

The space between the outer free end 32 of macaroni 20 and the inner curve 34 is determined by the distance of the near side 35 of the trough 12 from slot 14. In a similar manner, the space between outer free end 33 of macaroni 21 and inner curve 36 is determined by the distance between the near side 37 of trough 30 and slot 27.

By choosing passages of certain diameters, and shaping the trough correspondingly, macaroni of various shapes may be produced.

It is to be noted that each row of passages and its corresponding slot may be formed as a separate die and set in a plate as shown in Patent No. 1,912,021, May 30, 1933.

The crinkle or wave in brim 13 of macaroni 20 is controlled by the size of the diameter of the right hand passage 11, Fig. 3. By making said diameter large enough, an excess of dough is supplied, which is greater than can be smoothly curled back by the trough shown, with the result that crinkles or waves are formed increasing the circumferential length of the brim to accommodate the excess of dough thereby. In order for the brim to come out smooth, the distance across trough 12, that is the distance between the side 35 near the passages and the far side must be made greater than shown opposite right hand passage 11. Another factor which influences the crinkle is the relative diameters of the extreme right hand passage and that of the one just to its left. Too great a difference in diameter will induce the crinkle. The trough will cause crinkles when its location and shape causes an abrupt change in the curvature of the the dough stream reaching it.

Figure 10:
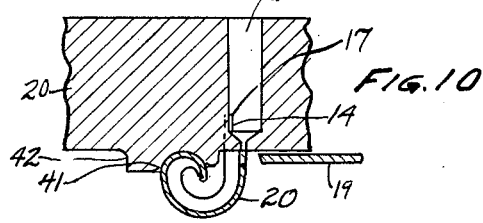
Fig. 10 is a partial section of a modified form of my die plate taken in a similar manner to that of Fig. 4.

Fig. 10 shows a modified form of my die plate. Here the trough 41, instead of being cut back into the plate 20, is cut back in a projecting portion 42 of said plate.

I claim:—

1. In a molding machine adapted for extrusion, a plate having a plurality of passages extending inwardly from one side, said plate having a slot formed therein extending inwardly from its other side across the inner end of said passages, and a trough on said latter side substantially opposite said slot, said passages and slot causing the material extruded therefrom to be curved back toward the plate, said trough being located to receive said material on its way back, and shaped to guide the material entering the trough to curl back upon itself.

2. In a molding machine adapted for extrusion, a plate having a plurality of passages extending inwardly from one side, said passages being arranged in a row, said plate having a continuous slot formed therein extending inwardly from its opposite side along substantially the inner ends of the row of passages, and a trough formed on said opposite side of the plate, said passages and slot causing the material extruded therefrom to curve back toward the plate, said trough being located to receive the extruded material when it has returned, the bottom of the trough being curved to guide the material to curl upon itself as continued extrusion of the material takes place.

3. In a molding machine adapted for extruding plastic material, a plate having a plurality of passages in a row extending inwardly from one side, said plate having a slot formed therein along the row of passages, extending inwardly from its opposite side to the passages, some of said passages being of larger cross-sectional area than the others, and a trough located on said plate substantially opposite said slot, being deeper and wider opposite said larger passages, than opposite the smaller, said passages and slot causing the material extruded to curve back and enter the trough substantially along the side farthest removed from the slot.

4. In a molding machine adapted for extruding plastic material, a plate having a plurality of passages extending inwardly from one side partly through the plate, said passages arranged in a row, said plate having a slot therein extending back from the opposite side of the plate to the passages, said slot extending back between said passages a substantially greater distance than the distance from said opposite face to the passages, the greater extension back, of the slot between the passages, effecting the coalescence of the material before its extrusion from the plate, said passages and slot effecting the curving back to the plate of the extruded material, said plate having a trough on said opposite side extending in the same general direction as the slot and located to receive said material on its way back to the plate, said trough being shaped to guide the material entering it into a curl, as more of said material is extruded from the slot.

5. In a molding machine adapted for extruding plastic material, a plate having a plurality of passages extending inwardly from one side partly through the plate, said passages arranged in a row, at least one of said passages being of larger cross-sectional area than others, said plate having a slot therein, opposite said passages, extending back from the opposite side of the plate to the passages, said plate having a trough on said opposite side substantially opposite said slot, the distance across the trough being greater opposite a larger passage than opposite those smaller, the material extruded from the slot curving back toward the plate and entering the trough, being curled upon itself thereby.

6. In a molding machine adapted for extruding plastic material, a plate having a plurality of passages extending inwardly from one side partly through the plate, said passages arranged in a row, the bottom of each passage being tapered to substantially an apex with the apex pointing toward the opposite side of the plate, said plate having a slot therein, extending back from said opposite side of the plate to the passages, said slot passing through the apex of each passage and inclining in opposite directions from the apex to the sides of each passage, said plate having a trough on said opposite side substantially opposite said slot, said passages and slot causing the material extruded therefrom to be formed in a series of transverse ridges curving longitudinally back toward the plate, said trough being located to receive said material on its way back, and shaped to guide the material entering the trough to spiral back upon itself.

7. In a molding machine adapted for extruding plastic material, a plate having a plurality of passages extending inwardly from one side partly through the plate, said passages being of substantially circular cross-section and arranged in a row, the bottom of each passage being substantially cone-shaped with the apex pointing toward the opposite side of the plate, said plate having a slot therein extending back from the opposite side of the plate to the passages, said slot being formed in a series of joined arcs with their convexity in substantially the same direction, an arc for each passage, substantially the midpoint of each arc passing through the apex of its corresponding passage, and the junction of adjacent arcs coming between their corresponding passages, said passages and slot causing the material extruded therefrom to be formed in a series of rounded transverse ridges curving longitudinally back toward the plate, said plate having a trough located to receive the material on its way back, and shaped to guide the material entering the trough to spiral back upon itself.

8. In a molding machine adapted for extruding plastic material, a plate as claimed in claim 6 having at least one of the passages of larger cross-sectional area than others with a correspondingly longer slot, and the distance across the trough greater opposite a larger passage than opposite those smaller.

9. In a molding machine adapted for extruding plastic material, a plate having a plurality of passages extending inwardly from one side partly through the plate, said passages arranged in a row, said plate having a slot therein extending back from its opposite side, said slot passing through the center of the bottom of each passage and inclining in opposite directions from said center to the sides of each passage, said plate having a trough on said opposite side substantially opposite said slot, said passages and slot causing the material extruded therefrom to be formed in a series of transverse ridges curving longitudinally back toward the plate, said trough being located to receive said material on its way back, and shaped to guide the material entering the trough to spiral back upon itself.

10. In a molding machine adapted for extruding plastic material, a plate having a plurality of passages extending inwardly from one side partly through the plate, said passages arranged in a row, said plate having a slot therein extending back from its opposite side to said passages, said slot extending in an irregular line along the row of said passages, said passages and slot causing the material extruded therefrom to be formed in a series of transverse ridges curving longitudinally back toward the plate, the shape of the ridges being determined by the irregularity of the line in which the slot extends along the row of said passages, said plate having a trough on said opposite side substantially opposite said slot, said trough being located to receive said material as it curves back to the plate, and shaped to guide the material entering the trough to curl back upon itself.

11. In a molding machine as claimed in claim 1, a knife operating to cut off the extruded material at the slot after a predetermined amount of material has been extruded to form the desired shaped curl.

12. In a molding machine as claimed in claim 1, a curved trough with steeply inclined sides.

13. In a molding machine adapted for extruding plastic material, a plate having a plurality of passages in a row extending inwardly from one side, said plate having a slot therein along the row of passages, extending inwardly from its opposite side to the passages, said plate having a curved trough located substantially opposite said slot, said passages and slot causing the material extruded to curve back toward the plate, said trough being located with reference to the slot so that the extruded material as it returns to the plate, enters the trough substantially along the side of the trough farthest removed from the slot, said latter side being inclined steeply with respect to the bottom of the trough.

14. In a molding machine adapted for extruding plastic material, a plate having a passage extending inwardly from one side, said plate having a slot therein extending inwardly from its opposite side to the passage, said plate having a trough located substantially opposite said slot, said passage and slot causing the material extruded therefrom to curve back toward the plate, the trough being located far enough away from the slot to receive the material as it curves back and shaped to curl said material back upon itself, said trough also causing an abrupt change in the curvature of the material received whereby crinkles are formed therein.

15. In a molding machine adapted for extruding plastic material, a plate having a plurality of passages in a row extending inwardly from one side, said plate having a slot therein along the row of passages, extending inwardly from its opposite side to the passages, said plate having a trough located substantially opposite said slot said passages and slot causing the material extruded to curve back toward the plate, said trough being located with reference to the slot so that the extruded material, as it returns to the plate, enters the trough substantially along the side of the trough farthest removed from the slot, said trough being shaped to guide the material entering it to spiral back upon itself, and a knife operating to cut off the extruded material at the slot after a predetermined amount of material has been extruded to form the desired shaped spiral, the distance from the slot of the side of the trough nearest to the slot, determining the amount of opening of the cut off edge of the material from the rest of the spiral.

ANGELO RONZONI.